(12) United States Patent
Tronnier et al.

(10) Patent No.: US 9,827,674 B2
(45) Date of Patent: Nov. 28, 2017

(54) METHOD AND MANIPULATOR ASSEMBLY FOR THE CONDITIONAL STOPPING OF AT LEAST ONE MANIPULATOR ON A PATH

(71) Applicant: KUKA Roboter GmbH, Augsburg (DE)

(72) Inventors: Holger Tronnier, Augsburg (DE); Günther Wiedemann, Gersthofen (DE); Stefan Burkhart, Dillingen a. d. Donau (DE); Andreas Aurnhammer, München (DE); Manfred Hüttenhofer, Meitingen (DE)

(73) Assignee: KUKA Roboter GmbH, Augsburg (DE)

( * ) Notice: Subject to any disclaimer, the term of this patent is extended or adjusted under 35 U.S.C. 154(b) by 76 days.

(21) Appl. No.: 14/969,513

(22) Filed: Dec. 15, 2015

(65) Prior Publication Data

US 2016/0176049 A1     Jun. 23, 2016

(30) Foreign Application Priority Data

Dec. 22, 2014   (DE) .......... 10 2014 226 789

(51) Int. Cl.
 *B25J 9/16*   (2006.01)
 *B25J 19/00*  (2006.01)
(52) U.S. Cl.
 CPC .......... *B25J 9/1664* (2013.01); *B25J 9/1674* (2013.01); *B25J 19/0004* (2013.01); *G05B 2219/39097* (2013.01); *G05B 2219/39098* (2013.01); *Y10S 901/02* (2013.01); *Y10S 901/09* (2013.01)

(58) Field of Classification Search
 CPC ... B21D 43/105; Y10S 901/02; Y10S 901/09; G05B 2219/39097; G05B 2219/39098; G05B 19/406; G05B 2219/41279; G05B 2219/45112; B25J 19/0004; B25J 9/1664; B25J 19/06
 USPC ................................. 700/245, 253; 901/2, 9
 See application file for complete search history.

(56) References Cited

U.S. PATENT DOCUMENTS

| | | | |
|---|---|---|---|
| 4,603,286 A | 7/1986 | Sakano | |
| 5,070,287 A | 12/1991 | Boehm | |
| 5,473,542 A | 12/1995 | Olomski et al. | |
| 6,166,504 A | 12/2000 | Iida et al. | |

(Continued)

FOREIGN PATENT DOCUMENTS

| | | |
|---|---|---|
| DE | 19535869 | 4/1997 |
| DE | 10361132 | 1/2005 |

(Continued)

OTHER PUBLICATIONS

Examination Report from GPTO in DE Appl. No. 10 2014 226 789.7, dated Oct. 9, 2015.

(Continued)

*Primary Examiner* — Dalena Tran

(57) ABSTRACT

A method for the conditional stopping of at least one manipulator and a manipulator assembly. The manipulator travels along a path which has a stopping point. In order to be able to stop the manipulator at the stopping point, a braking point on the path is calculated as a function of a speed of the manipulator. If the status of a travel condition variable necessitates braking of the manipulator in the event of exceeding the braking point, the manipulator is braked.

18 Claims, 3 Drawing Sheets

(56) References Cited

U.S. PATENT DOCUMENTS

Figure 1:
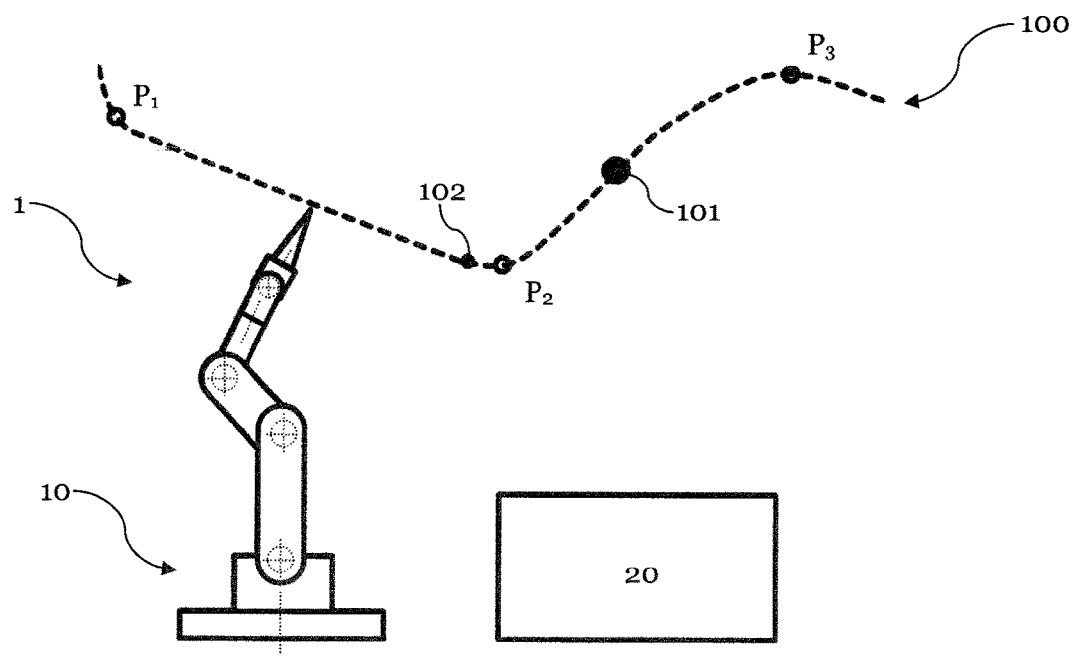

| | | | |
|---|---|---|---|
| 8,583,285 B2 | 11/2013 | Aurnhammer et al. | |
| 2006/0052901 A1* | 3/2006 | Nihei | B25J 9/1666 |
| | | | 700/245 |
| 2008/0021597 A1* | 1/2008 | Merte | F16P 3/141 |
| | | | 700/255 |
| 2014/0371905 A1* | 12/2014 | Eberst | B25J 9/1664 |
| | | | 700/253 |

FOREIGN PATENT DOCUMENTS

| | | |
|---|---|---|
| DE | 102011102297 | 1/2012 |
| EP | 1632318 | 3/2006 |
| EP | 2149829 | 2/2010 |
| WO | 2009055123 | 4/2009 |

OTHER PUBLICATIONS

Manfred Weck, "Machine Tools Manufacturing Systems Engineering 4," Automation of Machines and Systems, 5th Revised Edition, 2001.

The extended European Search Report, dated Sep. 8, 2016, in the related European Patent Appl. No. 15196403.8.

The English translation of the Korean Office Action, dated May 4, 2017, in the related Korean Patent Appl. No. 10-2015-0183155.

* cited by examiner

METHOD AND MANIPULATOR ASSEMBLY FOR THE CONDITIONAL STOPPING OF AT LEAST ONE MANIPULATOR ON A PATH

This application claims the benefit of priority under 35 §119(a) to German Patent Application No. 10 2014 226 789.7, filed on Dec. 22, 2014.

1. FIELD OF THE INVENTION

The invention relates to a method and a manipulator assembly for the conditional stopping of at least one manipulator on a path. The method and the manipulator assembly can be used, for example, in industrial applications, in which a programmed path can only be traveled along completely if a defined travel condition is met.

2. BACKGROUND

There are industrial applications (e.g. press linking, protected areas), in which a manipulator can only travel along a programmed path completely, if a defined travel condition (e.g. press=open) is met. If the travel condition is not met, the manipulator can only travel up to a determined stopping point. At the stopping point, the manipulator must have come to a complete standstill, i.e. be stopped. The manipulator waits in the stopping point for as long as it takes for the travel condition to be met. The stopping of the manipulator is thus the complete braking of all axes of the manipulator. The manipulator has been stopped when the speed of all axes is equal to zero.

A manipulator (robot or industrial robot) is, in accordance with DIN EN ISO 8373, an automatically guided, multi-purpose manipulator equipped with three or more freely-programmable movement axes, which is employed in a fixed or a mobile manner in industrial applications. It can carry grippers or tools (end effectors) or workpieces.

In order for the manipulator to stop at the stopping point, the braking of the manipulator must be commenced at a sufficiently early point on the path, at the so-called braking point, so that the braking point is preferably the point at which the braking must be commenced in order to completely brake the manipulator by the time the stopping point is reached. Braking points are known from the prior art, which are specified points usually taught or programmed into the manipulator by the user. The stopping point is likewise a taught point on the path of the manipulator.

As is known, a conditional stopping of the manipulator by program-controlled modification of the override is possible. Conditional stopping of the manipulator is understood to mean a stopping of the manipulator which takes place only if a respective condition is met. Such a condition can be defined, for example, by means of a travel condition variable, as described below. Override is understood as a chronological scaling variable of the manipulator movement. If the override is 100%, the manipulator travels the programmed movement in the originally programmed time. If the override is, for example, 50%, the manipulator travels the programmed movement in twice the amount of time. If the travel condition is not met when the braking point is reached, a corresponding reduction of the override allows the movement of the manipulator to be slowed and allows the manipulator to be braked. A disadvantage of this process is that the user must find a braking point which is as close as possible to the stopping point and which at the same time allows complete braking of the manipulator by the stopping point location, irrespective of the actual speed. Braking points must thus be selected which lie further away from the stopping point than is necessary for the actual speed of the manipulator, and this results in an extended cycle time.

A conditional stopping by means of blending of the stopping point is also known. Here too, a stopping point and a braking point are taught or programmed by the user. If the manipulator reaches the braking point and the travel condition is not met, the manipulator commences the braking and travels to the stopping point. If, however, the travel condition is met, the stopping point is not entered into, but is instead blended with a defined blending radius. Here too, the braking point must be selected such that the stopping point can be complied with, which leads to extended cycle times. In addition, the path taken in the case of braking deviates from the path without any braking, i.e. the braking is not true to the path. The objective of the present invention is to overcome the disadvantages mentioned. In particular, it is intended to allow a stopping point to be placed or fixed on a given path, without having to teach an additional geometrical path point (preferably braking point).

3. DETAILED DESCRIPTION OF THE INVENTION

The above-mentioned objectives are achieved by means of a method according to the invention for the conditional stopping of at least one manipulator in accordance with claim 1 and a manipulator assembly in accordance with Claim 5.

In particular, the above-mentioned objectives are achieved by means of a method for the conditional stopping of at least one manipulator, wherein the at least one manipulator travels along a path, which path has a stopping point, and the method comprises the following method step: Calculation of a braking point assigned to the stopping point as a function of a speed of the manipulator, with the braking point being a point on the path. The path is preferably a programmed and/or pre-defined path or trajectory along which the manipulator travels.

The speed of the manipulator is preferably assessed at the Tool Center Point (TCP). To calculate the braking point, the nominal speed of the manipulator at the time of the calculation is preferably used. Particularly preferably, the current speed of the manipulator is taken into account. By calculating the braking point as a function of the speed of the manipulator, the location of the braking point on the path of the manipulator is defined so far away from the stopping point that a stopping of the manipulator by the stopping point location can be reliably achieved. In addition, the location of the braking point is so close to the stopping point that the cycle time of the manipulator is reduced. The calculation of the braking point is preferably realized in a cyclic manner. This means that the location of the braking point as a function of the current speed of the manipulator is constantly updated. The calculation cycle is preferably not bound to a fixed time interval, but can in fact be adjusted.

In addition, the calculation of the braking point allows the braking operation to be carried out with optimized braking parameters. By contrast with previously known solutions with a specified braking point, braking parameters, such as the braking force, do not necessarily have to be adjusted in order to stop the manipulator in the stopping point. Instead, the braking point is calculated such that a braking with optimized braking parameters leads to a stopping of the manipulator in the stopping point. The braking parameters can be optimized with regards to recuperation, braking time, wear or other known optimization parameters.

The path of the manipulator can be based, for example, on a Point-to-Point (PTP) planning and/or a Continuous Path (CP) planning. The thus planned nominal path is traveled along by the manipulator (robot). The stopping point, at which the manipulator should be stopped, lies on the nominal path and is entered into with precise accuracy. The braking point is typically calculated using the nominal path. As a result of inertia or other disruptive influences, the actually traveled path of the manipulator (actual path) can deviate from the nominal path. The deviation between actual path and nominal path is preferably taken into account when calculating the braking point, so that the braking point preferably lies on the actual path.

The method for conditional stopping of at least one manipulator preferably additionally comprises the following steps: Checking of the status of a travel condition variable, after the calculation of the braking point, and braking of the manipulator if the status of the travel condition variable necessitates braking in the event of exceeding of the calculated braking point.

The time at which the calculated braking point is exceeded is preferably determined before the actual exceeding of the calculated braking point. For this purpose is calculated, based on the current point of the manipulator on the path, whether the manipulator could still stop before the taught stopping point in the event that the braking was initiated in the subsequent control cycle. If not, the braking point is exceeded by the manipulator, at the latest at the start of the next control cycle, and the braking of the manipulator must be initiated if the status of the travel condition variable necessitates braking.

The travel condition variable is preferably a Boolean variable, which indicates whether braking of the manipulator is required, or whether the path can continue to be traveled along. By way of an example, such a travel condition variable is the status of a press in a press linking application. If the press is open in the example (travel condition variable=TRUE), the manipulator can insert a workpiece into the press or remove it therefrom. The manipulator is allowed to travel along the path as planned. However, if the press is closed (travel condition variable=FALSE), travel along the path in accordance with the plan would cause a collision of manipulator and press. Braking of the manipulator is thus required. Alternatively, the travel condition variable can also be a non-Boolean variable. Such a non-Boolean variable can, for example, contain information about a necessary braking delay. The braking delay is a negative acceleration and determines the intensity of the braking.

The checking of the travel condition is advantageous, as the manipulator is only braked if braking is required. If, however, no braking is required, the planned path can be traveled along by the manipulator without a drop in speed.

The status of the travel condition variable is preferably cyclically monitored and, in the case of an initiated braking operation, the manipulator is accelerated again if the status of the travel condition variable changes during the braking of the manipulator. The status can be monitored, for example, 10 times per second, or at other appropriate time intervals.

The cyclic monitoring of the travel condition variable allows a flexible termination of the braking operation, so that the manipulator can again be accelerated as soon as the status of the travel condition variable no longer necessitates braking. The manipulator is then accelerated to the originally planned speed and the planned path is traveled along.

As a result, the loss of time caused by the initiated braking is limited, so that the cycle time of the manipulator is reduced.

In the method for conditional stopping of at least one manipulator, the braking action during a braking operation is preferably adjusted as a function of a travel condition variable, so that the manipulator stops completely, at the latest at the stopping point.

The adjustment of the braking action is advantageous, since, in addition to the location of the braking point itself, another variable is available which has direct influence on the point at which the manipulator actually stops. The manipulator can thus also be stopped in the taught and/or programmed stopping point if braking becomes necessary at a time when the optimal braking point for the existing speed has already been exceeded and the manipulator could no longer be stopped at the taught and/or programmed stopping point with the optimized braking parameters. By means of heavier braking, the manipulator can preferably be stopped even before the stopping point is reached, even though the braking was initiated later. Particularly preferably, the stopping point should not be exceeded. If this is no longer possible because the braking was initiated too late, a possible crash occurs at a reduced speed.

The stated objectives are further achieved by means of a manipulator assembly, comprising at least one manipulator and at least one control device, wherein the at least one manipulator is configured to travel along to a path, and the path has a stopping point, and the at least one control device is configured to calculate a braking point assigned to the stopping point as a function of a speed of the manipulator, with the braking point being a point on the path.

The control device controls the manipulator. It receives signals from the manipulator and sends commands to the manipulator. In addition, the control device can also receive external signals and convert them into commands for the manipulator. The travel condition variable is preferably set by an external signal.

The control device is preferably configured to check the status of a travel condition variable and to send a command to brake the manipulator, if the status of the travel condition variable necessitates braking.

Particularly preferably, the control device is additionally configured to cyclically monitor the status of the travel condition variable and, in the case of an initiated braking operation of the manipulator, to send a command to accelerate the manipulator, if the status of the travel condition variable changes during the braking of the manipulator.

The braking action during a braking operation is preferably adjustable as a function of the travel condition variable, so that the manipulator stops, at the latest at the stopping point.

Particularly preferably, the braking of the manipulator is true to the path. The manipulator travels along the planned path during the braking, without leaving this path. This is advantageous, since collisions with other objects situated in the surrounding environment can be avoided. In addition, the manipulator is able, after a path-true braking, to resume the programmed movement by means of acceleration. Upon completion of the acceleration, the manipulator thus continues traveling along the planned path at the programmed speed. A return of the manipulator to the planned path is not required, which means that cycle time can be saved.

The path preferably comprises at least one path section that is a spline. A spline is a function, which is made up piecewise of n-th degree polynomials. At the points at which two polynomial units coincide, certain conditions are imposed, for example, that the spline is continuously differentiable (n−1)-times. A spline can be defined, for example, by means of several programmed or taught points, with the specified points being traveled along by the manipulator in a precisely accurate manner.

A path section defined as a spline is advantageous, as the path section exists as a closed mathematical formula and the current position of the manipulator on the path section can be stated as a function of a scalar path progress variable. The path progress variable states the distance from the current position of the manipulator to a defined point on the path, which distance is measured on the path. The defined point is usually a programmed or taught point.

The location of the braking point on the path is preferably calculated using a path progress variable of the path. This is advantageous, as the braking point can be calculated particularly easily because the path progress variable is a scalar variable.

4. BRIEF DESCRIPTION OF THE FIGURES

Figure 2:
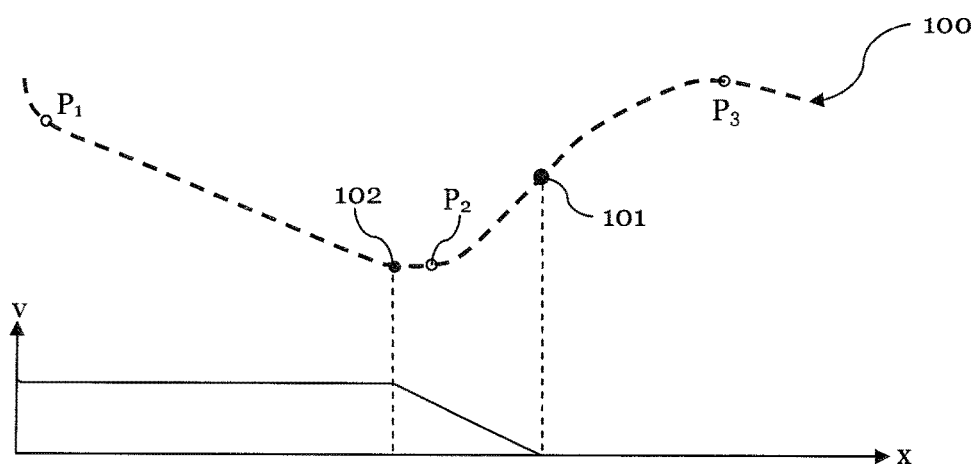
Figure 3A:
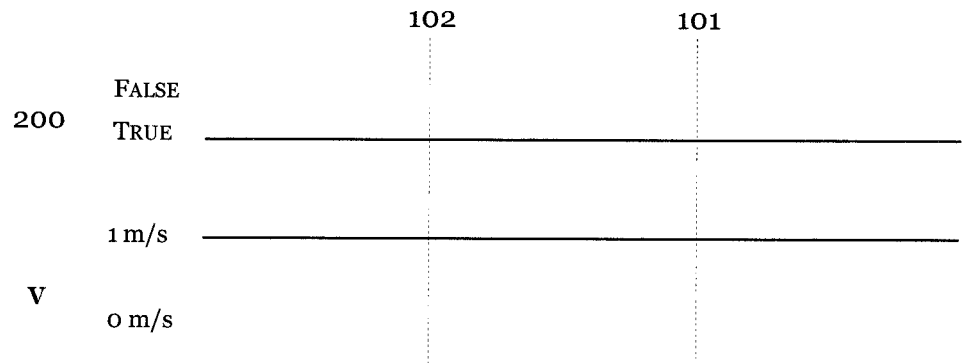
Figure 3B:
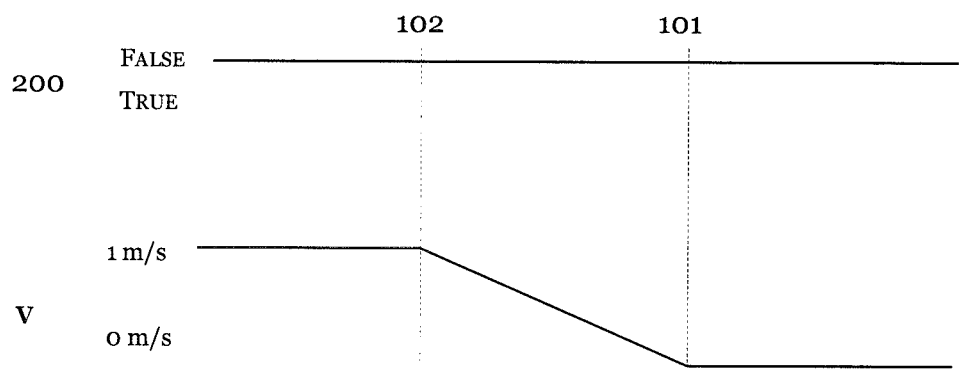
Figure 3C:
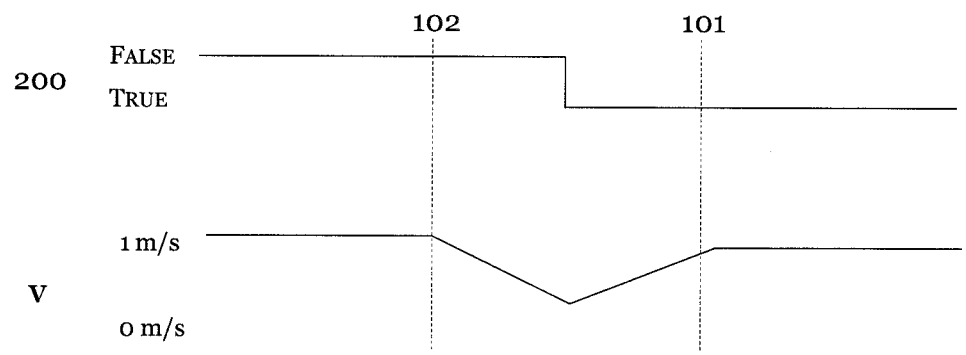
Figure 4A:
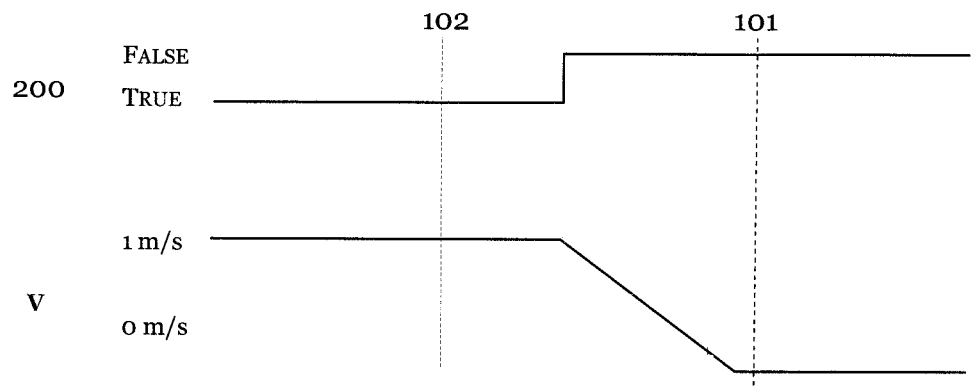
Figure 4B:
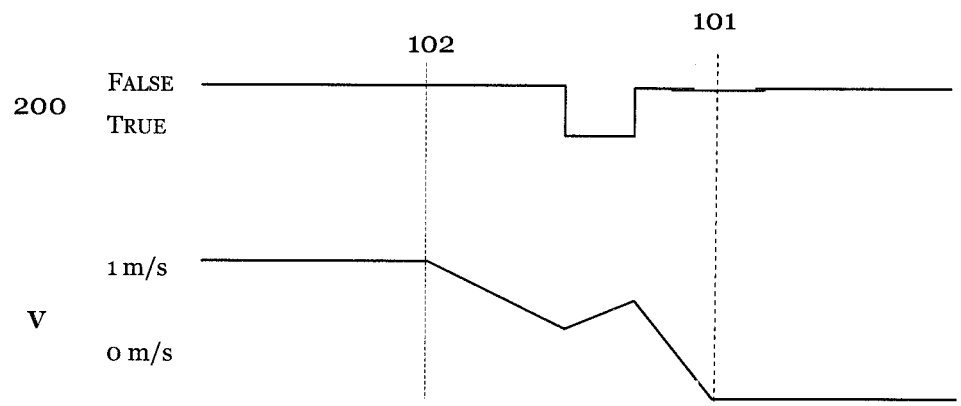

Preferred embodiments of the invention are explained in detail below with reference to the drawings; in which FIG. 1 shows a manipulator assembly comprising a manipulator and a control device;

FIG. 2 shows an exemplary path of the manipulator comprising a stopping point and a braking point;

FIGS. 3A-C show the change of the speed of the manipulator as a function of the travel condition variable in normal operation, and FIGS. 4A-B show the change of the speed of the manipulator as a function of the travel condition variable in the event of an emergency stop.

FIG. 1 shows a manipulator assembly 1, comprising a manipulator 10 and a control device 20. The depicted manipulator 10 is configured to travel along a path 100, which is defined as a spline. The path 100 is defined by the points $P_1$, $P_2$, $P_3$. The depicted stopping point 101 lies on the path 100 and determines the point at which the manipulator 10 should or must be stopped if braking is required. A braking point 102 is assigned to the stopping point 101. The location of the braking point 102 is calculated by the control device 20 as a function of the speed of the manipulator 10; it is therefore not specified, but is instead dependent on the speed of the manipulator. The braking point 102 is the point at which the braking is commenced if braking is required.

FIG. 2 is a schematic depiction of an exemplary path 100 of the manipulator 10, which path is defined as a spline by the points $P_1$, $P_2$, $P_3$. A diagram is also presented, in which the speed v of the manipulator is plotted against the path progress variable x. The depiction is to be understood as a schematic depiction, and is not to scale. As can be seen in the diagram, the manipulator 10 travels along the path 100 at a constant speed. The path should be traveled in the direction from point $P_1$ to point $P_3$. In the presented case, in the calculated braking point 102, the status of the travel condition variable is set such that braking is required. The manipulator thus brakes and stops in the stopping point 101. The speed of the manipulator in the stopping point is equal to zero, as shown.

FIGS. 3A through 3C show diagrams of three typical cases of the conditional stopping with optimized braking parameters, and FIGS. 4A and 4B show diagrams of two typical cases of conditional stopping with changed braking action in order to stop the manipulator 10 by the stopping point 101 location. Each of these figures first plots the status of the travel condition variable 200. The travel condition variable 200 can, in the present exemplary cases, assume the values TRUE and FALSE. The status TRUE does not require braking of the manipulator 10, the status FALSE, however, requires a braking of the manipulator 10. The speed v of the manipulator 10 is plotted below the travel condition variable 200. In the present case, the planned speed v of the manipulator 10 is equal to 1 m/s. The broken vertical line identified by reference numeral 102 corresponds to the braking point 102 on the path, and the broken vertical line identified by reference numeral 101 corresponds to the stopping point 101.

FIG. 3A shows the case in which the travel condition variable 200 always takes the status TRUE, and thus no braking is required. In the example of the press linking, this corresponds to a constantly open press. Accordingly, the manipulator travels along the path without a change of speed, as can be seen in the speed diagram.

FIG. 3B shows the case in which the travel condition variable 200 always takes the status FALSE. In the example of the press linking, this corresponds to a constantly closed press. Braking is thus required in the event of exceeding of the calculated braking point 102. As can be seen in the speed diagram, the manipulator is braked from the braking point 102 and stops in the stopping point 101.

FIG. 3C shows the case in which the travel condition variable 200 initially takes the status FALSE. After exceeding the braking point 102, the status of the travel condition variable 200 changes from FALSE to TRUE. In the example of the press linking, this corresponds to an opening of the press, once the manipulator has already exceed the calculated optimal braking point 102. Because the travel condition variable is now met and braking is no longer required, the braking operation is terminated. The manipulator is again accelerated to the planned speed of 1 m/s.

FIG. 4A showed the case in which the travel condition variable 200 initially takes the status TRUE. After exceeding the braking point 102, the status of the travel condition variable 200 changes from TRUE to FALSE. In the example of the press linking, this corresponds to a malfunction, which is caused, for example, by the fact that the press begins to close once the calculated braking point 102 has already been exceeded. If such a change in the status of the travel condition variable 200 is detected during the cyclical monitoring of the travel condition variable 200, in order to still be able to stop the manipulator 10 in the stopping point 101 the braking must occur with increased braking action compared with the optimized braking parameters. In the case shown in FIG. 4A, due to the increased braking action, the manipulator is stopped even before it reaches the stopping point 101.

FIG. 4B shows the case in which the travel condition variable 200 initially takes the status FALSE, and braking is required. This braking operation is initiated, as can be seen in the speed diagram, when the braking point 102 is reached. The status of the travel condition variable 200 then changes from FALSE to TRUE. Thus, braking is now no longer required. In a similar way to the case shown in FIG. 3C, the braking operation is terminated, and the manipulator is accelerated again. The status of the travel condition variable 200 changes again, however, in the shown case, namely from TRUE to FALSE. Thus, once again, a (heavy) braking of the manipulator 10 is required now. In order to be able to stop the manipulator 10 in the stopping point 101, a braking with increased braking action is required now. In the shown case, due to the increased braking action, the manipulator 10 can be stopped in the stopping point 101.

It should be noted that the invention claimed herein is not limited to the described embodiments, but may be otherwise variously embodied within the scope of the claims listed infra.

REFERENCE NUMERAL LIST

1 Manipulator assembly
10 Manipulator
20 Control device
100 Path
101 Stopping point
102 Braking point
200 Travel condition variable
v Manipulator speed
x Path progress variable
$P_1, P_2, P_3$ Definition points of the path

The invention claimed is:

1. A method performed by a manipulator control device for controlling the braking of at least one manipulator for stopping the at least one manipulator at a predetermined stopping point, wherein the at least one manipulator is configured to travel along a path and the path includes the predetermined stopping point, comprising:
   calculating a braking point assigned to the stopping point as a function of a speed (v) of the manipulator, with the braking point being calculated as a point on the path at which braking is commenced in order to stop the at least one manipulator at the predetermined stopping point;
   monitoring a status of a travel condition variable; the status indicating whether the travel condition is met or unmet, and
   conditionally braking the manipulator at or beyond the braking point while the status of the travel condition variable is unmet.

2. The method according to claim 1, wherein the status of the travel condition variable is cyclically monitored and, in the case of an initiated braking operation, the manipulator is accelerated if the status of the travel condition variable changes during the braking of the manipulator.

3. The method according to claim 2, wherein the braking of the manipulator is true to the path.

4. The method according to claim 2, wherein the path comprises at least one path section that is a spline.

5. The method according to claim 2, wherein the location of the braking point on the path is calculated using a path progress variable (x) of the path.

6. The method according to claim 1, wherein the braking action during a braking operation is adjusted as a function of the travel condition variable, so that the manipulator stops at the latest at the stopping point.

7. The method according to claim 1, wherein the braking of the manipulator is true to the path.

8. The method according to claim 1, wherein the path comprises at least one path section that is a spline.

9. The method according to claim 1, wherein the location of the braking point on the path is calculated using a path progress variable (x) of the path.

10. A manipulator assembly comprising:
    at least one manipulator; and
    at least one control device for controlling operation of the manipulator, wherein:
    the at least one manipulator is configured to travel along a path, and the path has a predetermined stopping point at which the at least one manipulator is stopped when a predetermined travel condition is unmet,
    the at least one control device is configured to calculate a braking point assigned to the stopping point as a function of a speed (v) of the manipulator, with the braking point being a point on the path, and
    the at least one control device is further configured to monitor the status of a travel condition variable indicating whether the travel condition is presently met or unmet, and to initiate conditional braking of the manipulator at or beyond the braking point while the status of the travel condition variable is unmet.

11. The manipulator assembly according to claim 10, wherein the control device is additionally configured to cyclically monitor the status of the travel condition variable and, in the case of an initiated braking operation of the manipulator, to send a command to accelerate the manipulator if the status of the travel condition variable changes during the braking of the manipulator.

12. The manipulator assembly according to claim 11, wherein the braking of the manipulator is true to the path.

13. The manipulator assembly according to claim 11, wherein the path comprises at least one path section that is a spline.

14. The manipulator assembly according to claim 11, wherein the location of the braking point on the path is calculated using a path progress variable (x) of the path.

15. The manipulator assembly according to claim 10, wherein the braking action during a braking operation is adjustable as a function of the travel condition variable so that the manipulator stops completely, at the latest at the stopping point.

16. The manipulator assembly according to claim 10, wherein the braking of the manipulator is true to the path.

17. The manipulator assembly according to claim 10, wherein the path comprises at least one path section that is a spline.

18. The manipulator assembly according to claim 10, wherein the location of the braking point) on the path is calculated using a path progress variable (x) of the path.

* * * * *